(12) United States Patent  
Beckmann et al.

(10) Patent No.: US 10,977,219 B2  
(45) Date of Patent: *Apr. 13, 2021

(54) MIGRATING CONTENT ITEMS

(71) Applicant: Dropbox, Inc., San Francisco, CA (US)

(72) Inventors: Chris Beckmann, San Francisco, CA (US); Joshua Jenkins, San Francisco, CA (US); Francois Alexander Allain, San Francisco, CA (US); Jeffrey Bartelma, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 684 days.

This patent is subject to a terminal disclaimer.

(21) Appl. No.: 14/660,113

(22) Filed: Mar. 17, 2015

(65) Prior Publication Data

US 2015/0186412 A1 Jul. 2, 2015

Related U.S. Application Data

(63) Continuation of application No. 13/728,734, filed on Dec. 27, 2012, now Pat. No. 9,002,815.

(51) Int. Cl.
*G06F 16/185* (2019.01)
*G06F 16/22* (2019.01)
*G06F 16/11* (2019.01)

(52) U.S. Cl.
CPC .......... *G06F 16/185* (2019.01); *G06F 16/119* (2019.01); *G06F 16/22* (2019.01)

(58) Field of Classification Search
CPC ......... G06F 17/30312; G06F 17/30221; G06F 17/30079; G06F 17/30017;
(Continued)

(56) References Cited

U.S. PATENT DOCUMENTS 7,251,670 B1 7/2007 Day
7,441,002 B1 10/2008 Catchpole et al.
(Continued)

FOREIGN PATENT DOCUMENTS

WO 2012/177253 A1 12/2012

OTHER PUBLICATIONS

U.S. Office Action dated Aug. 19, 2014, issued in co-pending U.S. Appl. No. 13/728,734.
(Continued)

*Primary Examiner* — James Trujillo
*Assistant Examiner* — Fariborz Khoshnoodi
(74) *Attorney, Agent, or Firm* — Polsinelli PC

(57) ABSTRACT

Disclosed are systems, methods, and non-transitory computer-readable storage media for migrating content items from a source user account to a target user account. A user can specify content items in the source user account to be migrated to an existing or new target user account. A new content entry including an account identifier of the target account and a pointer to the content item can be created for each migrated content item. Further, a determination can be made as to whether a sharing link to each content item exists, and if so, the content pointer of the old content entry is modified to forward or redirect to the new content entry. An active flag associated with the old content entry can be set to false or 0 to indicate that the old content entry is no longer active.

24 Claims, 9 Drawing Sheets

(58) Field of Classification Search
CPC ......... G06F 17/30038; G06F 17/30126; G06F 17/3089; G06F 17/30575; G06F 16/185; G06F 16/22; G06F 16/119
USPC ................................................ 707/705, 736
See application file for complete search history.

(56) References Cited

U.S. PATENT DOCUMENTS

| | | | |
|---|---|---|---|
| 8,006,111 B1* | 8/2011 | Faibish | G06F 1/3268 |
| | | | 711/114 |
| 8,484,346 B2 | 7/2013 | Lipscomb et al. | |
| 9,613,382 B1 | 4/2017 | Newstadt et al. | |
| 2004/0236798 A1* | 11/2004 | Srinivasan | G06F 17/302 |
| 2005/0050170 A1* | 3/2005 | Hsu | G06Q 30/0603 |
| | | | 709/219 |
| 2005/0216532 A1 | 9/2005 | Lallier | |
| 2006/0059253 A1 | 3/2006 | Goodman et al. | |
| 2006/0090049 A1* | 4/2006 | Saika | G06F 3/0605 |
| | | | 711/162 |
| 2007/0094286 A1* | 4/2007 | Murthy | G06F 17/30917 |
| 2008/0021997 A1* | 1/2008 | Hinton | H04L 63/0815 |
| | | | 709/225 |
| 2008/0155214 A1 | 6/2008 | Shitomi | |
| 2009/0083304 A1 | 3/2009 | Dornbach et al. | |
| 2009/0327054 A1* | 12/2009 | Yao | G06Q 30/02 |
| | | | 705/12 |
| 2011/0296025 A1 | 12/2011 | Lieblich et al. | |
| 2012/0144302 A1* | 6/2012 | Campanotti | G06F 17/30038 |
| | | | 715/716 |
| 2012/0278725 A1* | 11/2012 | Gordon | H04N 21/2665 |
| | | | 715/738 |
| 2014/0181220 A1* | 6/2014 | Griffin | G06F 3/0647 |
| | | | 709/206 |
| 2014/0189355 A1* | 7/2014 | Hunter | H04L 63/06 |
| | | | 713/171 |
| 2014/0195516 A1 | 7/2014 | Balakrishnan et al. | |

OTHER PUBLICATIONS

U.S. Notice of Allowance dated Dec. 1, 2014, issued in co-pending U.S. Appl. No. 13/728,734.

PCT Search Report and Written Opinion dated Sep. 16, 2015 for Application No. PCT/US2015/040545, filed Jul. 15, 2015, titled, "Unregistered User Account Generation for Content Item Sharing", 11 pages.

\* cited by examiner

|  | Account Identifier | Content Path | URL Flag | URL Active Flag | Content Pointer |
|---|---|---|---|---|---|
| 205 | 1 | /photos/file1 | 0 | 0 | 0001 |
| 210 | 2 | /docs/file | 1 | 1 | 0002 |
| 215 | 1 | /photos/file2 | 1 | 0 | 0003 |

| Account Identifier | Content Path | URL Flag | URL Active Flag | Content Pointer |
|---|---|---|---|---|
| 1 | /photo/file1 | 0 | 0 | 0001 |

FIG. 3a

| Account Identifier | Content Path | URL Flag | URL Active Flag | Content Pointer |
|---|---|---|---|---|
| 2 | /photo/file1 | 0 | 0 | 0001 |

FIG. 3b

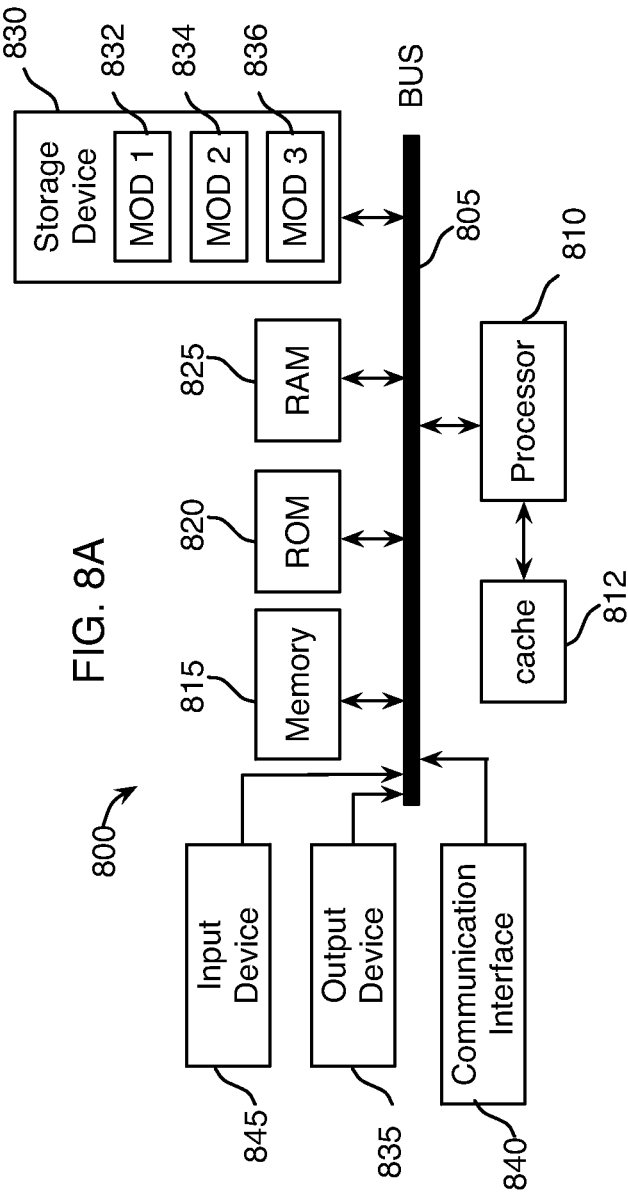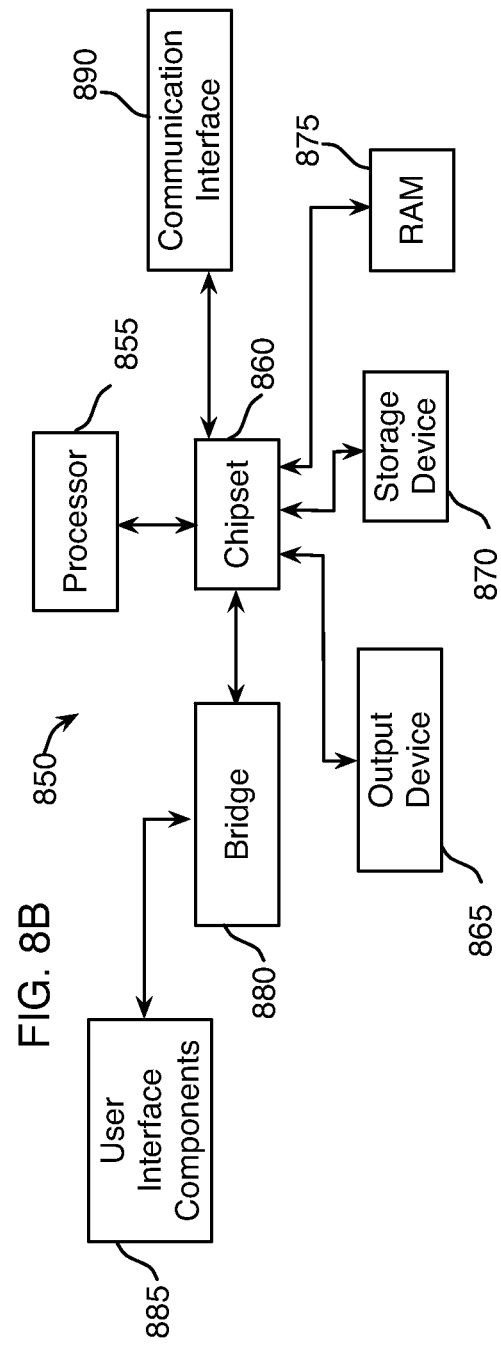

MIGRATING CONTENT ITEMS

CROSS REFERENCE TO RELATED APPLICATIONS

This application is a continuation of U.S. patent application Ser. No. 13/728,734, filed Dec. 27, 2012, now U.S. Pat. No. 9,002,815, the contents of each of the above patent applications are hereby expressly incorporated by reference in their entirety for all purposes herein.

TECHNICAL FIELD

The present technology pertains to migrating content items across user content storage accounts, and more specifically pertains to migrating content items from a source user account to a target user account.

BACKGROUND

Online storage accounts enable users to maintain a variety of content items in a safe and secure location where the user can access the content items at any time from any computing device. Additionally, users can easily share content items with friends, co-workers and family, either through shared online storage accounts or the use of generated links to content items stored in the online storage account. While sharing content is easy, migrating content to a different online storage account can be time consuming and cumbersome. Users are required to download the content items stored in the online storage to a local storage, delete the content items from the online storage and upload the content items to the new online storage account. In addition to having to deal with the long download and upload times, users also may have to reorganize the uploaded files into an appropriate file hierarchy in the new user account. Finally, links made to share content items are broken because the content items have been moved from their previous location. A user therefore must create new links and distribute them to replace the previous links. Accordingly, there exists a need for an improved way to migrate content in an online storage to a different user account.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for migrating content items from a source user account to a target user account. A content management system can include a migration module configured to present users with a migration interface enabling a user to specify content items in a source user account to be migrated to a target user account. The migration interface can allow a user to select an existing account as the target user account or create a new account to be the target user account.

The content management system can be configured to create a new content entry for each content item selected for migration. The new content entry can be associated with an account identifier of the new account and include a content pointer to the content item that is copied from the old content entry associated with the content item. Further, the new content entry can include a data path identifying the name of the content item and a file hierarchy. In some embodiments, the content path can be copied from the old content entry. In some embodiments, a new file hierarchy can be selected by the user and the content path can indicate the new file hierarchy.

The content management system can also determine whether a sharing link has been created to the content item. For example, the old content entry can include a link flag indicating whether a sharing link has been created to the content item. If a sharing link has been created, the content management system can modify the old content entry to forward or redirect to the new content entry. For example, the content pointer of the old content entry can be modified to point to the new content entry. Further, upon creating the new content entry, an active flag associated with the old content entry can be set to false or 0 to indicate that the old content entry is no longer active.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 shows an exemplary content directory;

FIGS. 3a and 3b show a new content entry created when migrating a content item to a target user account;

FIGS. 8A and 8B show exemplary possible system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an improved way to migrate content in a source online storage account to a target online storage account. This can be useful when personal content items and shared content items have been comingled in a single online storage account. For example, an employee may store personal content items along with work related content items in an online storage account provided by their employer. The employee may wish to remove the personal content items because a work administrator may have access to the online storage account and thus, the employee's personal content items.

The disclosed technology can provide a migration interface that is configured to migrate selected content items to a target user account. The migration interface can be configured to enable a user to select the content items to be migrated and the target user account. Further, the disclosed technology can ensure that any previously created sharing links to the personal content items remain active after the personal content items are migrated.

Figure 1:
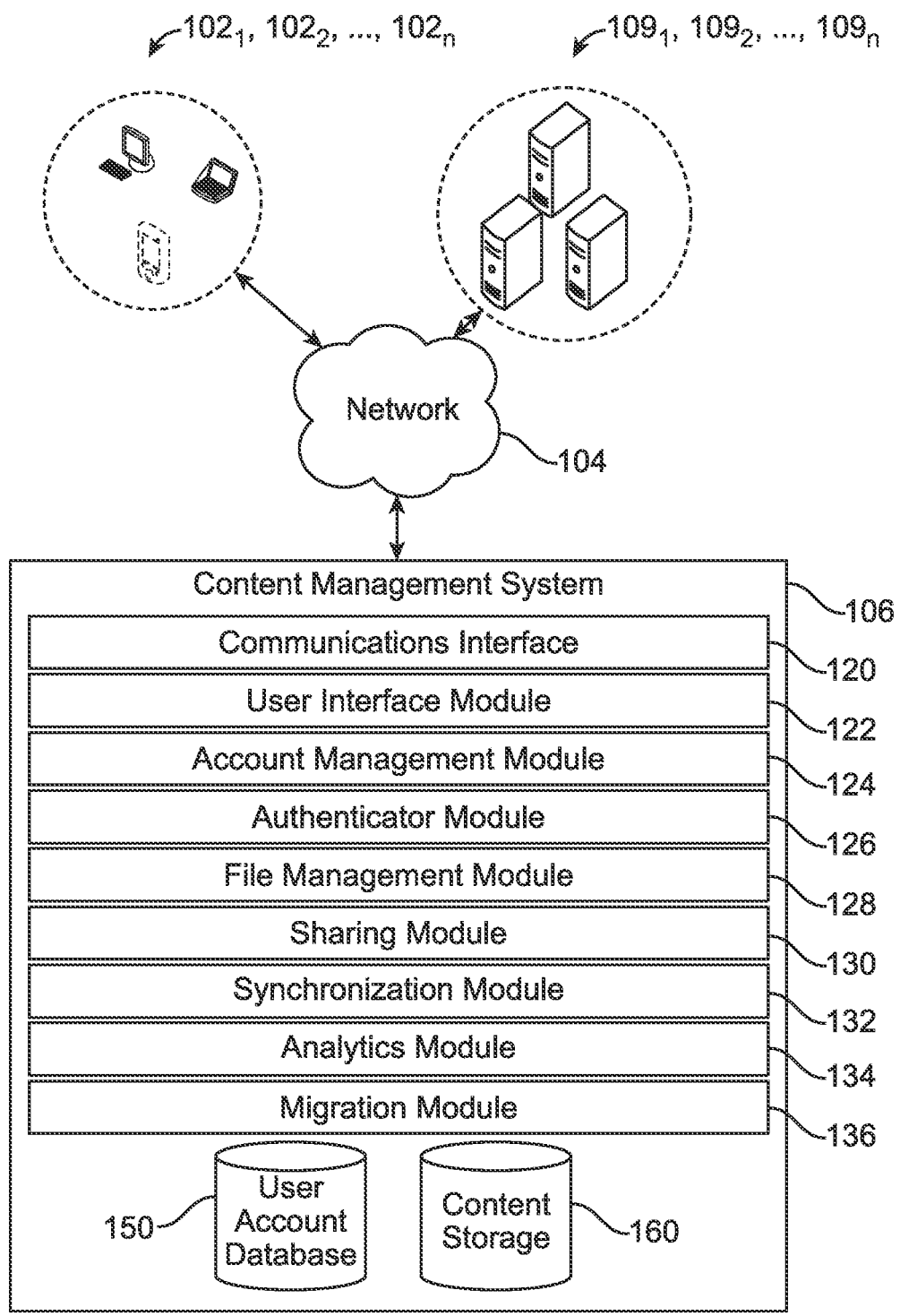
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that shown in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate chunks of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, . . . , $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the content item. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

FIG. 2 shows an exemplary content directory 200. As illustrated, there are three content entries in the content directory and each content entry includes 5 values: user account identifier, content path, content pointer, URL flag, and URL active flag. As illustrated, the first content entry 205 and third content entry 215 each have the same user account identifier '1' indicating that both content entries are associated with the same user account. The second content entry 210 is associated with a different user account identifier, '2,' and thus a different user account.

The content path includes a file name and folder hierarchy. As illustrated, the first entry 205 is associated with a content item named file1 and located in the photos folder. The second content entry 210 is associated with a content item named file and located in the docs folder and the third content entry 215 is associated with a content item named file2 and located in the photos folder.

As illustrated, the URL flag and the URL active flag of the first content entry 205 are both set to 0 or false indicating that a URL has not been created for the content item associated with the content entry. The second content entry 210, in contrast, has a value of 1 for the URL flag and URL active flag indicating that a URL has been created to the content item associated with the content entry and that the URL is active and thus the content item should be returned in response to a user selecting the URL. Finally the third content entry 215 has a value of 1 or true for the URL flag and a value of 0 for the URL active flag. Thus a URL to the content item associated with the content entry 215 has been created, however the URL has been deactivated and thus the content item should not be returned in response to selection of the URL.

The content pointer value indicates the location in storage memory of the content item associated with each content entry. As illustrated, the first content entry 205 has a content pointer of 0001, indicating that the content item associated with the content entry is located at memory location 0001. The content pointer for the second 210 and third 215 content pointers point to different locations in memory.

Returning to the discussion of FIG. 1, in some embodiments, the content management server can include migration module 136 configured to migrate content associated with a first user account to a second user account. This can be useful in situations when a user wishes to remove content associated with a shared user account and put it into a personal user account, or vice versa.

To accomplish this, migration module 136 can be configured to present a migration interface configured to enable a user to select content items in a source user account to be migrated to a target user account. For example, the migration interface can be configured to display the content items associated with the source account and enable a user to select content items to be migrated to the target user account.

Further, the migration interface can be configured to prompt a user to enter or select a target user account to which the selected content items will be migrated. In some embodiments, the user can select an existing user account as a target account. For example, the migration interface can include text fields prompting a user to enter a username and password of the target user account. Migration module 136 can be configured to communicate with authentication module 126 to authenticate the provided user name and password and access the target account to retrieve account data associated with the target user account. For example, migration module 136 can retrieve the user account identifier associated with the target account, data indicating the contents of the target account, etc.

In some embodiments, migration interface 136 can be configured to enable a user to create a new user account that serves as the target user account. For example, the migration interface can be configured to prompt a user for user data to create a new user account. Migration module 136 can gather account data while creating the new target account that can be used to migrate the content items to the target account. For example, migration module 136 can gather the user account identifier associated with the newly created target account.

To migrate the selected content items to the target user account, migration module 136 can be configured to create a new content entry for each selected content item using the account identifier associated with the target user account and the data stored in the existing source content entry, including the content pointer. Thus, the new entry can point to the same content item as the previous content entry but have the account identifier associated with the target user account rather than the account identifier associated with the source user account.

FIGS. 3a and 3b show a new content entry created when migrating a content item to a target user account. FIG. 3a illustrates the old content entry prior to the content item being migrated. As illustrated, the account identifier is 1, the content path is /photo/file1 and both the URL flag and URL active flag are set to 0, and the content pointer points to location 0001 in memory. FIG. 3b illustrates the new content entry resulting from the migration of the content item from a source user account to a target user account. As illustrated, the account identifier in the new content entry is 2, indicating that the content item is now associated with a different user account, while each of the content path, URL flag and URL active flag remain the same as the account entry illustrated in FIG. 3b. Further, the content pointer has the same value, 0001, as the content pointer of the old content entry illustrated in FIG. 3a. The new content entry, therefore, points to the same location in memory as the old content entry and thus the new content entry will retrieve the same content item as the old content entry. It should also be noted that, although in this embodiment, the content path from the old content entry to the new content entry are the same, this is only an example and not meant to be limiting. In some embodiments, the content path can be changed from the old content entry to the new content entry.

In some embodiments, the content item can be moved to a different location in memory upon being migrated to a target user account. For example, each user account can have a specified allocation of memory for content items stored in the user account. A content item that is migrated to a target user account can be copied to a new memory location associated with the target user account. Further, the content item can be deleted from the memory location associated with the source user account. The new content entry created for the migrated content item can included a content pointer pointing to the memory location of the content item stored in the memory allocated to the target user account.

Returning to the discussion of FIG. 1, upon creating the new content entry, in some embodiments, migration module 136 can be configured to delete the old content entry. In some embodiments, each content entry can include an active entry flag and migration module 136 can be configured to set the flag 0 or false to indicate that the content entry is no longer active. This type of embodiment enables records of changed content entries to be maintained if ever needed.

One problem that arises from migrating content items is that a previously created URL to the migrated content item will no longer be able to access the content item because the URL is configured for the original user account. To avoid this problem, the migration module 136 can be configured to determine whether a URL has been previously generated for each content item to be migrated. For example migration module 136 can be configured to check the URL flag associated with the content item to determine whether a URL to the content item has been created. If a URL has been created, the migration module can modify the old content entry associated with the content item to forward or redirect to the new content entry. For example, the content pointer of the old content entry can be modified to point or direct to the new content entry. Requests for the migrated content item originating from a URL created prior to the content item being migrated will thus access the content item through the old content entry even though the content item is associated with the target user account. Thus, a previously created URL can still be used to access a migrated content item and the content item will be associated with the target user account.

While content management system 106 is presented with specific components, it should be understood by one skilled in the art, that the architectural configuration of system 106 is simply one possible configuration and that other configurations with more or less components are also possible.

Figure 4:
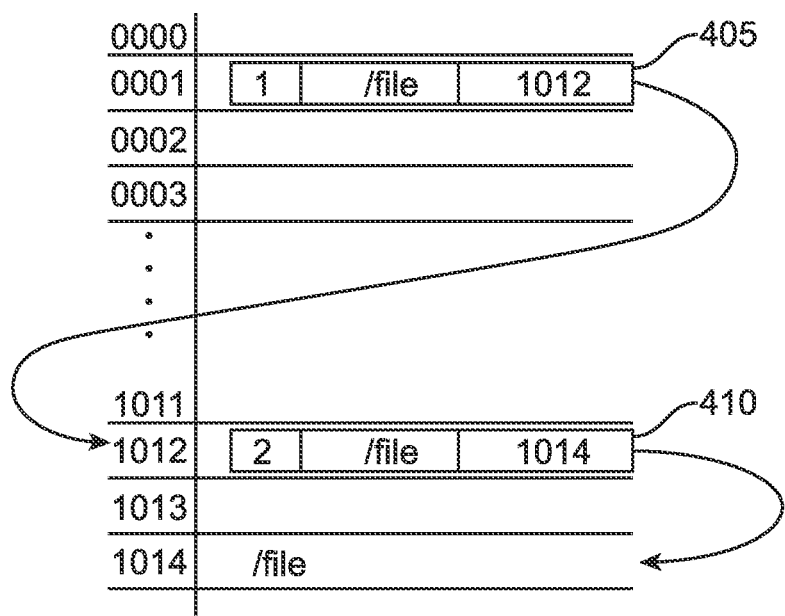
FIG. 4 shows a visual representation of a URL being forwarded to the new content entry from the old content entry.

FIG. 4 shows a visual representation of a URL being forwarded to the new content entry from the old content entry. The URL links to the old content entry based on the user account identifier and the data path included in the link. As illustrated, old content entry 405 is located at memory location 0001. The old content entry contains three values: an account identifier, file path and content pointer. Originally, the content pointer of the content entry 405 pointed to the content item at location 1014. As illustrated, the content pointer is modified to point to memory location value 1012, which is the location of new content entry 410. New content entry 410 points to memory location 1014, which is the location of the content item named file. Thus a URL link to old content entry 405 is forwarded to new content entry 410, which then forwards to the content item.

Figure 5:
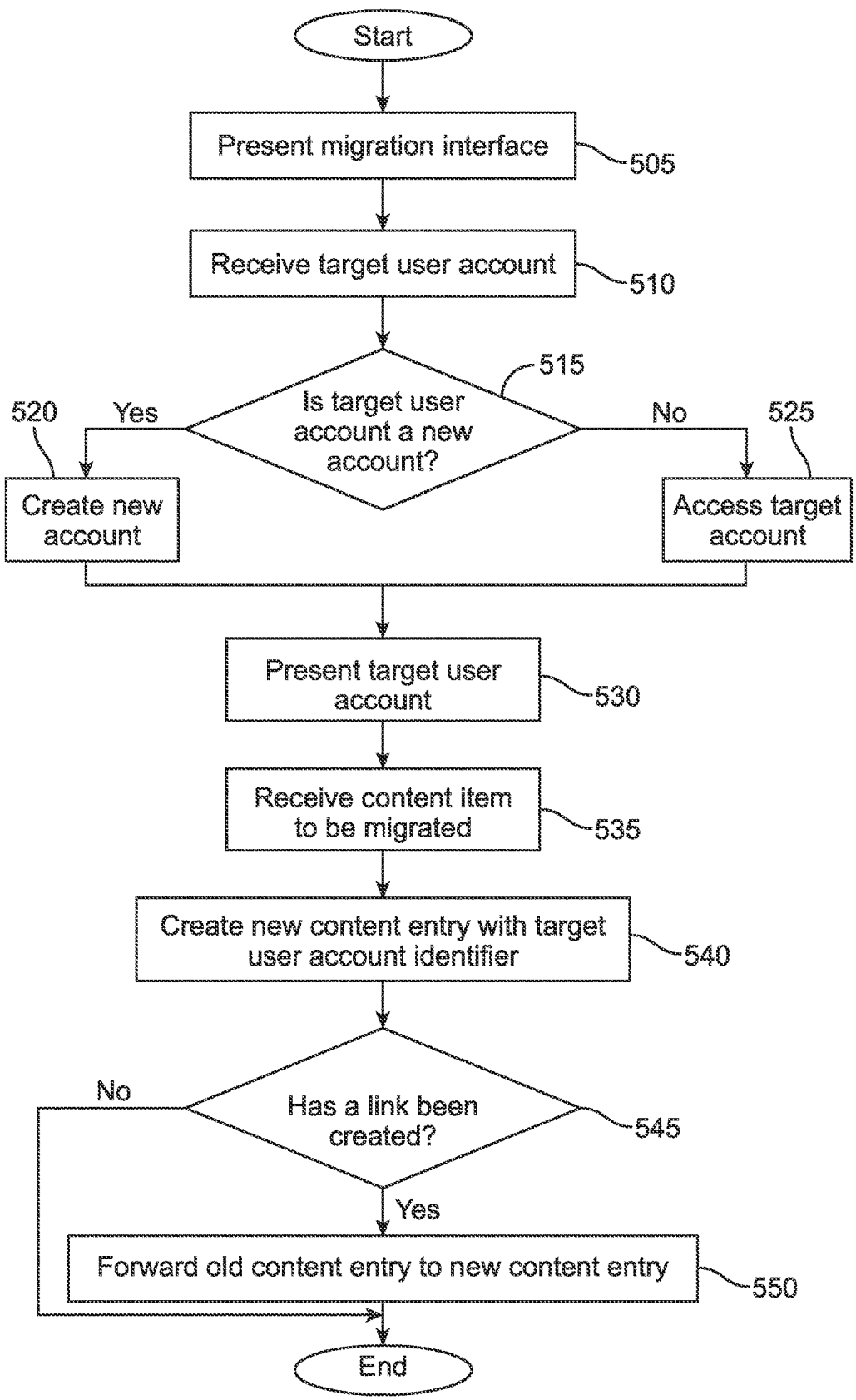
FIG. 5 shows an exemplary method embodiment of migrating content items from a source user account to a target user account.

FIG. 5 shows an exemplary method embodiment of migrating content items from a source user account to a target user account. As illustrated, the method begins at block 505 where the migration interface can be presented to the user. The migration interface can include user interface elements enabling a user to select a target user account as well as present the contents of the source user account.

At block 510 the target user account data can be received. For example, the user can use the provided user interface elements to enter a target user account. This can include a user name and password of an existing account or account information used to create a new account.

Upon receiving the target user account data, the method continues to block 515 where it is determined whether the target user account is a new account. If the target user account is a new account, the method continues to block 520 where a new account can be created. For example, the target user account data can include necessary data to create the new account. Alternatively, in some embodiments, the user can be prompted for additional information necessary to create the new user account. Once created, the new user account can be the target user account to which content items will be migrated.

If at block 515 it is determined that the target user account is an existing account, the method continues to block 525 where the target user account can be accessed.

The method continues to block 530 where the target user account can be presented to the user. This can include presenting all of the content items in the target user account in their folder hierarchy. The method continues to block 535 where input indicating a content item to be migrated can be received. This can be done in numerous ways. For example, in some embodiments, the user can select a content item by clicking on the content item or a user interface element such as a checkbox provided next to the content item. In some embodiments, the user can select a content item from the source user account and drag it to the target user account.

After a content item is selected, the method continues to block 540 where a new content entry including the account identifier of the target user account can be created for the selected content item. This step is disclosed in more detail in FIG. 6.

After a new content entry is created, the method continues to block 545 where it can be determined if a URL has been previously created to the old content entry associated with the content item. For example, the URL flag can indicate if a URL to the content item has been created. If a URL has been created, the method continues to block 550 where the old content entry associated with the content item can be forwarded to the new content item associated with the content entry. This can include modifying the content pointer to point to the new content entry instead of pointing to the content item.

Figure 6:
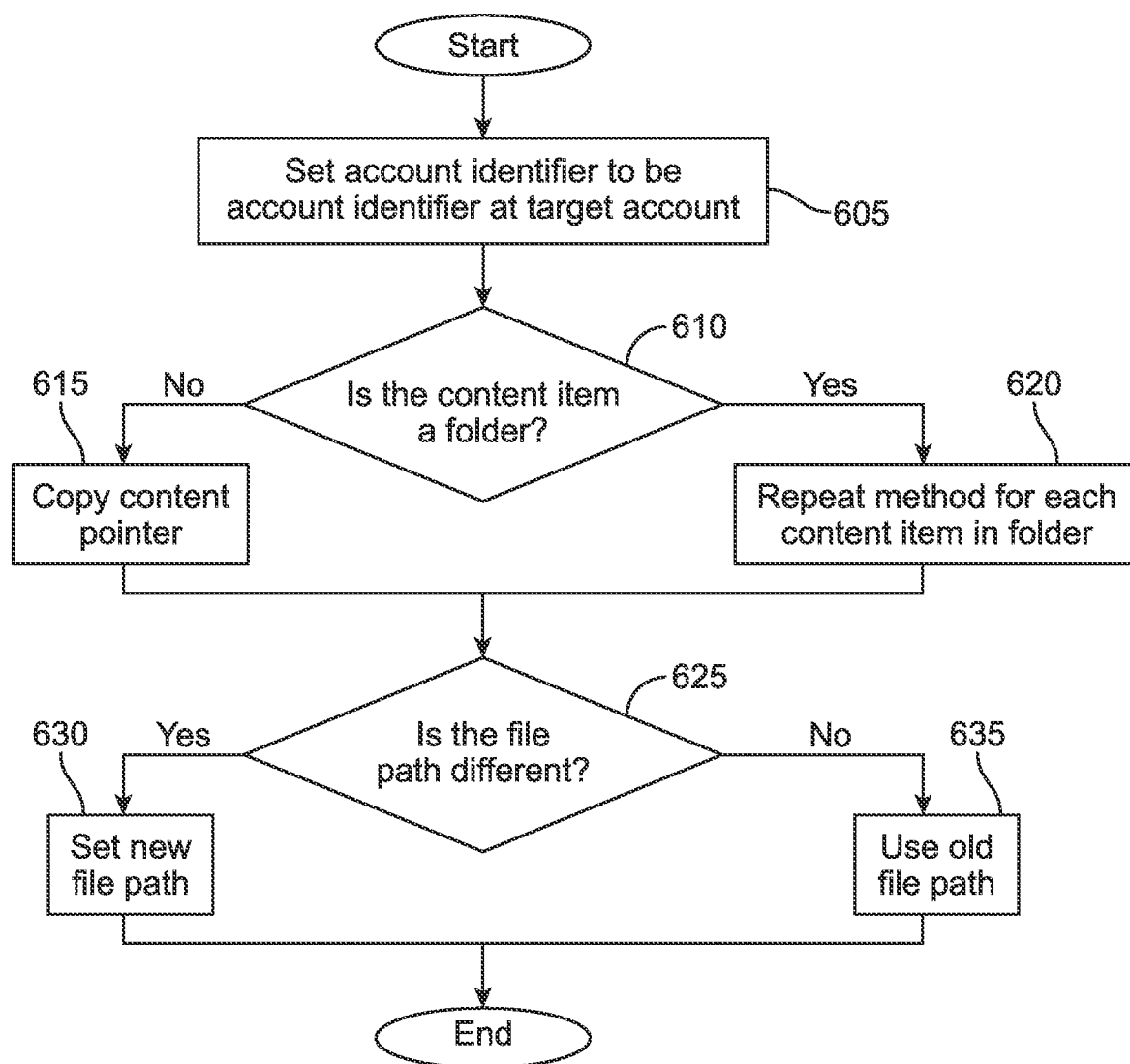
FIG. 6 shows an exemplary method embodiment of creating a new content entry for a migrated content item.

FIG. 6 shows an exemplary method embodiment of creating a new content entry for a migrated content item. As illustrated, the method begins at block 605 where the account identifier of the new content entry can be set to the content identifier associated with the target user account. Thus the target user account can be authorized to access the content item.

At block 610 it is determined whether the content item is a folder. For example, the content entry can include a folder flag indicating whether the content item is a folder. If the content item is a folder, the method continues to block 620 where the illustrated method can be repeated for each content item in the folder. Thus a new content entry can be created for the folder and each content item in the folder. To accomplish this, the content path can be used to determine all other content items stored in the folder. If at block 610 it is determined that the content item is not a folder, the content pointer of the new content entry can be set to be the same as the content pointer of the old content entry. Thus the new content entry can point to the content item to be migrated.

The method continues to block 625 where it can be determined whether the content path has changed. For example, in some embodiments, the user can select a new folder hierarchy to locate the content item in the target user account. If it is determined that the content path has been changed, the method continues to block 630 where the new content path can be set in the new content entry. If at block 635 the content path has not been changed, the content path in the new content entry can be set to be the same as the content path from the old content entry.

Figure 7A:
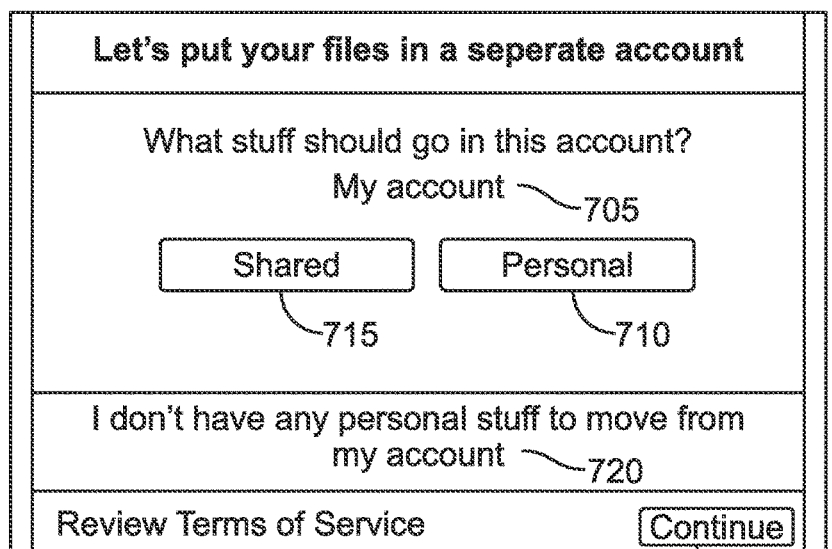
FIGS. 7a-7d show exemplary screen shots of a migration interface.

FIGS. 7*a*-7*d* shows exemplary screen shots of a migration interface. FIG. 7*a* illustrates a first view of the migration interface in which the user is prompted to confirm that that the user would like to migrate content in the source user account to a target user account. As illustrated in FIG. 7*a*, the migration interface presents the user name "my account" 705 associated with the source user account and prompts the user to select whether the source account should include shared or personal content items. Two user interface element buttons, a personal button 710 and a shared button 715, are included to enable a user to select whether the content items to remain in the source account are personal or shared content items. The user can select the corresponding button to choose between the two options. Although migrating to separate shared and personal content items is illustrated, this is just one possible example and is not meant to be limiting. The content items can be migrated based on any criteria such as work, organization, etc.

The interface further includes a text portion with a selectable link 720 that enables the user to indicate that the user does not wish to migrate any content items from the source account 705. The link 720 can be configured such that, upon selection, the migration interface will be closed. Finally, the migration interface includes a continue button 725 that is enabled to move the user forward to the next view in the migration interface. The user can select the continue button 725 upon having made a selection between whether the content to remain in the source account is personal or shared content items. Alternatively, in some embodiments, the migration interface will not includes the continue button 725. For example, the personal 710 and shared buttons 715 can be configured to move the user forward to the next view of the migration interface.

Figure 7B:
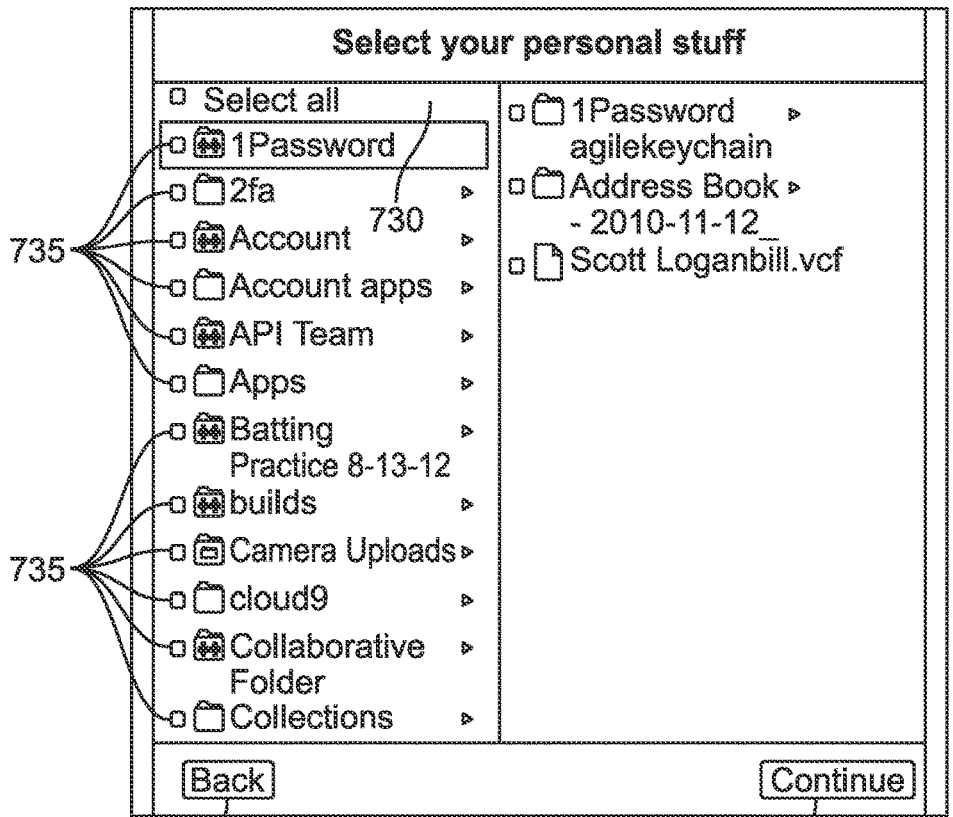

FIG. 7*b* shows a screenshot of the migration interface where a user has indicated that the items to remain in the source account are shared content items. As illustrated, the user is prompted to select the personal content items to be migrated. Further, the full contents of the source account 730 are presented to the user. A user interface element checkbox 735 is presented beside each content item to enable a user to select the content items to be migrated. The migration interface also include a back button 740 and a continue button 745 configured to enable a user to return to the previous view or next view of the migration interface.

Figure 7C:
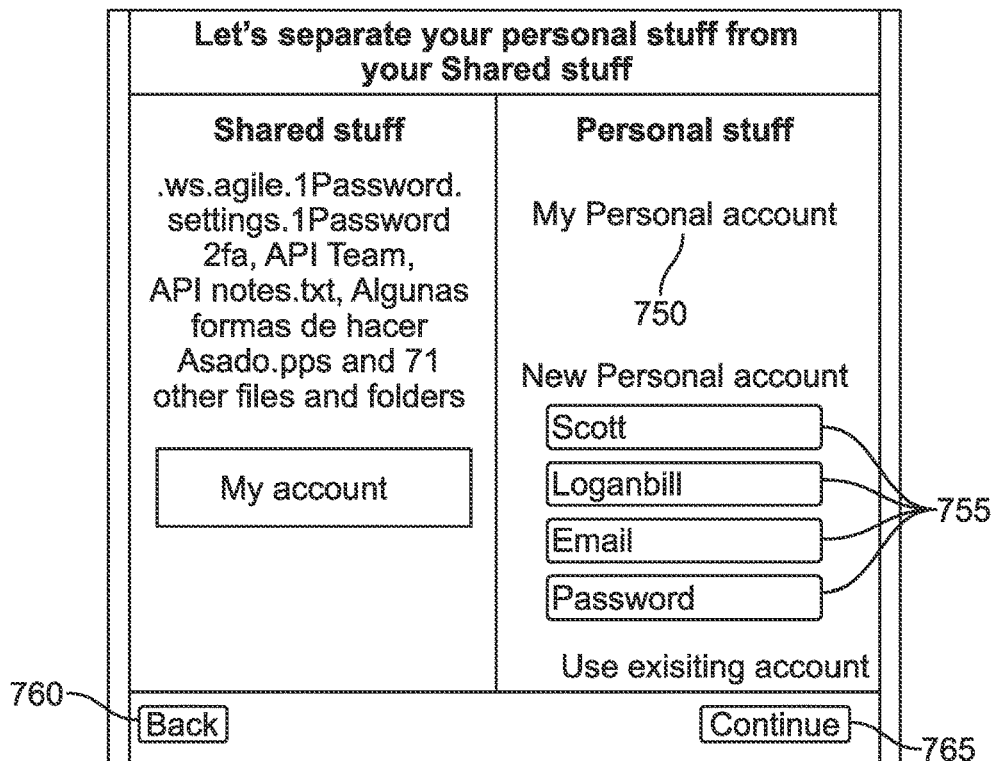

FIG. 7*c* shows the next view of the migration interface. As illustrated, the user is prompted to enter a target user account. The user can either select to use an existing account or enter information to create a new account as the target account. As illustrated, the existing account user name 750 is presented to the user, and text fields 755 are included to receive information to create a new account. In some embodiments, text fields can also be presented to receive information to identify the existing user account. For example, the text fields can prompt a user to enter a user name and password. The migration interface also includes back button 760 and a continue button 765 configured to enable a user to return to the previous view or next view of the migration interface.

Figure 7D:
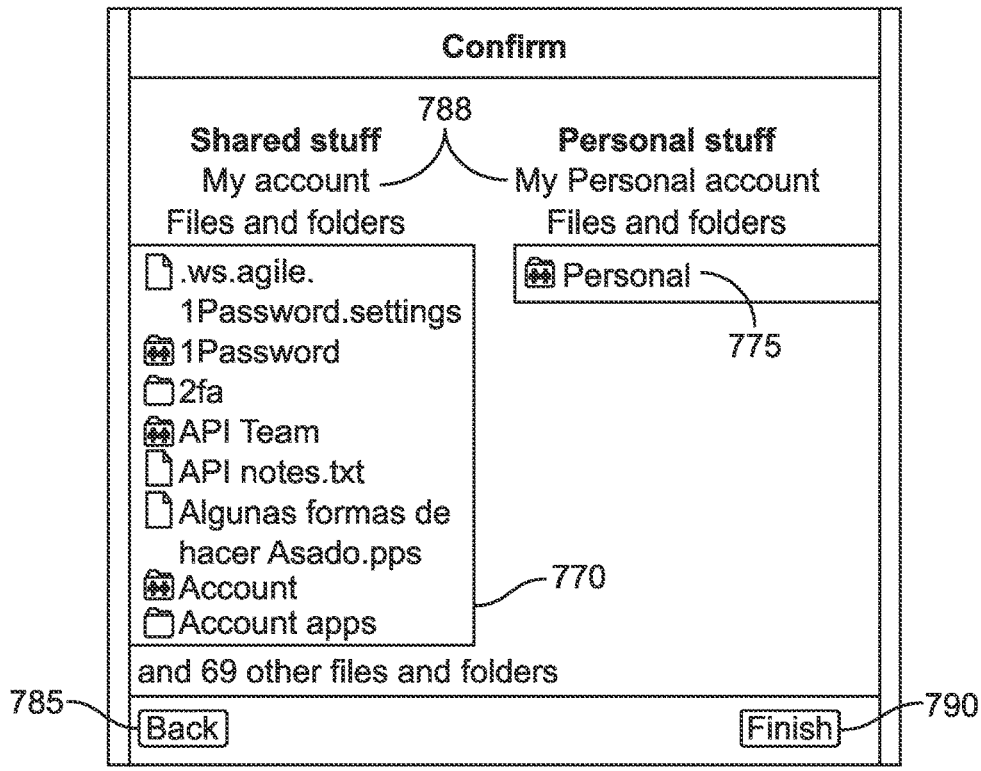

FIG. 7*d* shows another view of the migration interface in which the user's selections are presented for confirmation. As illustrated, the interface presents the content items 770 to remain in the source user account and the content items 775 to be migrated to the target user account. Further, the user name for the source and target user accounts 780 are presented to ensure the user has selected the correct content items to be migrated. The interface also includes a back button 785 configured to return the user to the previous view of the migration interface. Finally, the migration interface includes a finish button 790 configured to complete the migration process. It should be noted that in some embodiments, the migration interface can be configured to migrate content items to multiple target user accounts. In these types of embodiments, the migration interface can be configured to receive information identifying multiple target user accounts and content items to migrate to each target user account.

FIGS. 8A and 8B shows exemplary possible system embodiments. The more appropriate embodiment will be apparent to those of ordinary skill in the art when practicing the present technology. Persons of ordinary skill in the art will also readily appreciate that other system embodiments are possible.

FIG. 8A shows a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 1005. In one aspect, a hardware module that performs a particular function can include the software component stored in a computer-readable medium in connection with the necessary hardware components, such as the processor 810, bus 805, display 835, and so forth, to carry out the function.

FIG. 8B shows a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 1060 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
   receiving a request at a synchronized online content management system to migrate a content item from a source user account in the synchronized online content management system to a target user account in the synchronized online content management system;

determining, by the synchronized online content management system, that the content item is assigned a sharing link by the synchronized online content management system, the sharing link providing access to the content item and being associated with an original content entry in the synchronized online content management system, the original content entry including an original content pointer pointing to a location of the content item in the synchronized online content management system;

migrating the content item to the target user account by creating a new content entry in the synchronized online content management system for the content item, the new content entry including:
an account identifier identifying the target user account; and
a new content pointer pointing to the location of the content item in the synchronized online content management system; and modifying the original content pointer to identify the new content entry to allow access to the content item from the sharing link after migration to the target user account.

2. The method of claim 1, further comprising:
presenting a migration interface displaying content items of the source user account, wherein the migration interface is configured to:
receive an input identifying the target user account; and
receive an input identifying the content item to be migrated.

3. The method of claim 1, further comprising:
creating a new user account, wherein the new user account is the target user account.

4. The method of claim 1, further comprising:
determining if a sharing link has been previously created to access the content item.

5. The method of claim 2, wherein the migration interface is further configured to:
receive a content path for the content item, the content path indicating a file hierarchy for the content item in the target user account.

6. The method of claim 4, further comprising:
checking a link flag of the original content entry to determine whether a sharing link has been previously created to access the content item, wherein the link flag is a Boolean value indicating whether a sharing link has been previously created to access the content item.

7. The method of claim 1, further comprising:
setting an active flag of the original content entry to indicate that an old content entry is no longer active.

8. A system comprising:
a processor; and
memory containing instructions that, when executed, cause the processor to:
receive a request at a synchronized online content management system to migrate a content item from a source user account in the synchronized online content management system to a target user account in the synchronized online content management system,
determine, by the synchronized online content management system, that the content item is assigned a sharing link by the synchronized online content management system, the sharing link providing access to the content item, and being associated with an original content entry in the synchronized online content management system, the original content entry including an original content pointer identifying a location in the synchronized online content management system;
migrate the content item to the target user account by creatinge a new content entry in the synchronized online content management system for the content item, the new content entry including:
an account identifier identifying the target user account; and
a new content pointer identifying the location in the synchronized online content management system; and
modify the original content pointer to identify the new content entry to allow access to the content item from the sharing link after migration to the target user account.

9. The system of claim 8, wherein the instructions further cause the processor to:
present a migration interface displaying the content items of the source user account, wherein the migration interface is configured to:
receive input identifying the target user account; and
receive input identifying the content item to be migrated.

10. The system of claim 8, wherein the instructions further cause the processor to:
create a new user account, wherein the new user account is the target user account.

11. The system of claim 8, wherein the instructions further cause the processor to:
determine if a sharing link has been previously created to access the content item.

12. The system of claim 9, wherein the migration interface is further configured to:
receive a content path for the content item, the content path indicating a file hierarchy for the content item in the target user account.

13. The system of claim 11, wherein the instructions further cause the processor to check a link flag of the original content entry to determine whether a sharing link has been previously created to access the content item, wherein the link flag is a Boolean value indicating whether a sharing link has been previously created to access the content item.

14. The system of claim 8, wherein the instructions further cause the processor to:
set an active flag of the original content entry to indicate that an old content entry is no longer active.

15. A non-transitory computer-readable medium containing instructions that, when executed by a computing device, cause the computing device to:
receive a request at a synchronized online content management system to migrate a content item from a source user account in the synchronized online content management system to a target user account in synchronized online content management system,
determine, by the synchronized online content management system, that the content item is assigned a sharing link by the synchronized online content management system, the sharing link providing access to the content item, and being associated with an original content entry in the synchronized online content management system, the original content entry including an original content pointer identifying a location in the synchronized online content management system;

migrate the content item from the location identified by the original content pointer to a new location in the synchronized online content management system;

create a new content entry for the content item, the new content entry including:
an account identifier identifying the target user account; and
a new content pointer identifying the new location in the synchronized online content management system to which the content item was moved; and modify the original content pointer to identify the location of the new content entry to allow access to the content item from the sharing link after migration to the target user account.

16. The non-transitory computer-readable medium of claim 15, wherein the instructions further cause the computing device to:
present a migration interface displaying the content items of the source user account, wherein the migration interface is configured to:
receive input identifying the target user account; and
receive input identifying the content item to be migrated.

17. The non-transitory computer-readable medium of claim 15, wherein the instructions further cause the computing device to:
create a new user account, wherein the new user account is the target user account.

18. The non-transitory computer-readable medium of claim 15, wherein the instructions further cause the computing device to:
determine if a sharing link has been previously created to access the content item.

19. The non-transitory computer-readable medium of claim 16, wherein the migration interface is further configured to:
receive a content path for the content item, the content path indicating a file hierarchy for the content item in the target user account.

20. The non-transitory computer-readable medium of claim 18, wherein the instructions further cause the computing device to:
check a link flag of the original content entry to determine whether a sharing link has been previously created to access the content item, wherein the link flag is a Boolean value indicating whether a sharing link has been previously created to access the content item.

21. The non-transitory computer-readable medium of claim 15, wherein the instructions further cause the computing device to:
set an active flag of the original content entry to indicate that an old content entry is no longer active.

22. The method of claim 5, wherein the new content entry further includes the received content path.

23. The system of claim 12, wherein the new content entry further includes the received content path.

24. The non-transitory computer-readable medium of claim 19, wherein the new content entry further includes the received content path.

* * * * *